United States Patent [19]

Schultenkamper

[11] 3,940,948

[45] Mar. 2, 1976

[54] UNIVERSAL JOINT SHAFT

[75] Inventor: Josef Schultenkamper, Essen, Germany

[73] Assignee: Gelenkwellenbau GmbH, Germany

[22] Filed: Sept. 24, 1974

[21] Appl. No.: 508,840

[30] Foreign Application Priority Data

Sept. 27, 1973 Germany............................ 2348629

[52] U.S. Cl..................... 64/17 R; 64/1 V; 64/23; 74/573 R
[51] Int. Cl.² .......................................... F16D 3/26
[58] Field of Search............ 64/17 A, 17 R, 1 V, 23; 74/574, 573

[56] References Cited
UNITED STATES PATENTS

| 2,377,096 | 5/1945 | Nichols | 74/573 |
|---|---|---|---|
| 3,611,830 | 9/1971 | Shank | 74/574 |
| 3,824,808 | 7/1974 | Mangiavacchi | 64/617 |

FOREIGN PATENTS OR APPLICATIONS

| 465,259 | 5/1937 | United Kingdom | 64/1 V |

Primary Examiner—Allan D. Herrmann
Assistant Examiner—Randall Heald
Attorney, Agent, or Firm—Hill, Gross, Simpson, Van Santen, Steadman, Chiara & Simpson

[57] ABSTRACT

A universal joint shaft assembly is balanced by weights carried in rings of C-shaped cross section surrounding the assembly adjacent the universal joints and the weights are retained in balancing positions by locally deforming the outer peripheral leg or arm of the C-shaped ring into gripping relation with the weights. Where the weights are made of soft metal, notches of the ring can be pressed into the weights. The C-shaped rings can be anchored to components adjacent the joints of the universal shaft by pressing flaps out of the webs of the rings and securing these flaps to the joint components or can be integral parts of a tube surrounding the shaft.

10 Claims, 3 Drawing Figures

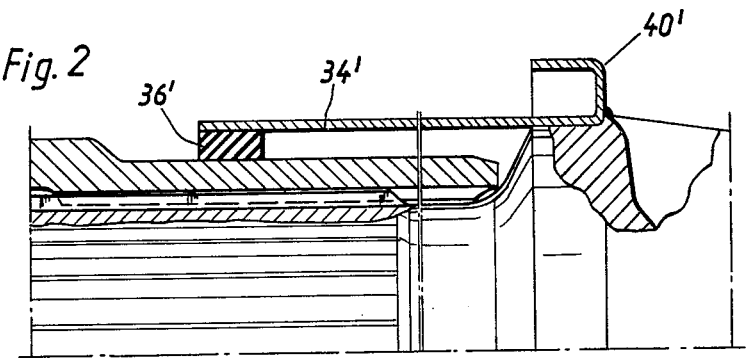
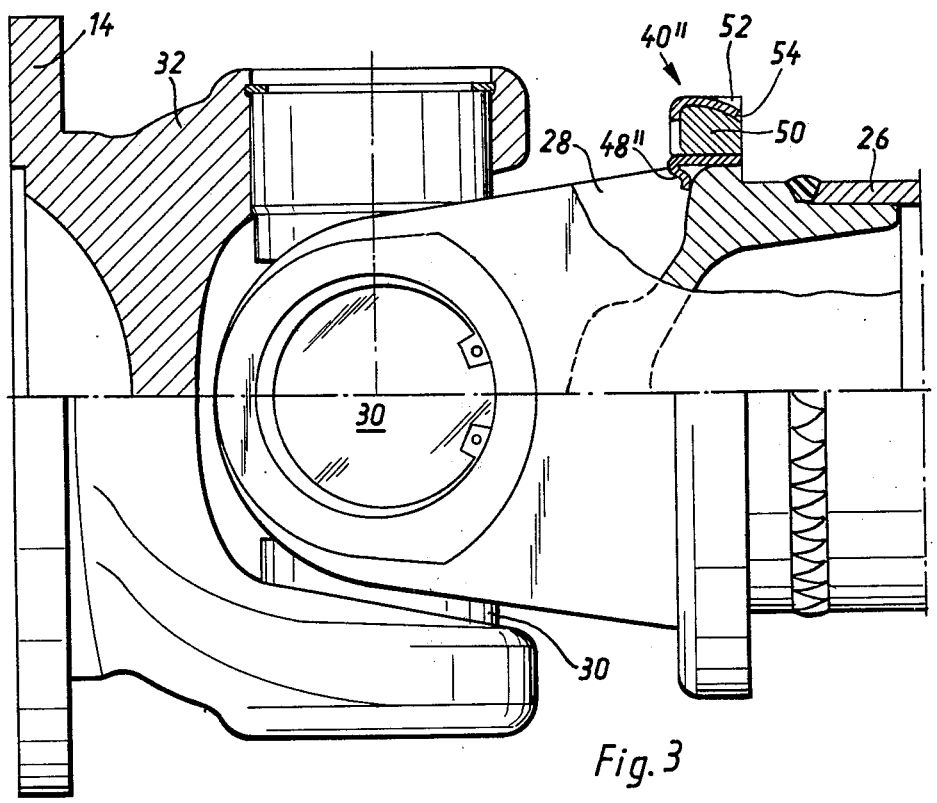

UNIVERSAL JOINT SHAFT

BACKGROUND OF THE INVENTION

1. Field of the Invention

This invention relates to the art of balancing universal joint shaft assemblies and particularly deals with the mounting of balancing weights in C-shaped rings carried by universal joint components and deforming the rings to lock the weights in balancing positions.

2. Prior Art

German utility model Pat. No. 1,746,291 dated Apr. 8, 1957 issued to the assignee of this application discloses a universal joint having an annular groove of dove-tail cross section receiving wedge-shaped weights pressed against the inner walls of the grooves by a set screw between adjoining halves of the weights. This arrangement requires a high concentration of material to accommodate the annular groove without unduly weakening the assembly. Such concentration of material is not available in small and medium sized universal shaft assemblies. Therefore, in such assemblies it has been necessary to determine the dynamic unbalance on a balancing machine and compensate the unbalance at least approximately by weights in the form of metal strips spot welded near the joints. In many cases, however, for reasons of deficiency of available space or owing to excessive unbalances, this is insufficient to insure quiet running of the shafts and balancing could only be obtained by selective removal of material by boring or grinding. These procedures are complicated and time consuming, requiring special balancing machines equipped with devices for welding the balancing weights and/or removing the material. In such cases, after the unbalance has been measured on the balancing machine, the universal shaft has had to be transferred to a work bench or separate device where balancing weights are welded on, after which the shaft is again placed on the balancing machine for a test run following which material is removed if required at another separate operating station. Frequently, additional test runs are necessary.

Furthermore, in nearly all prior art cases, the welding for securing of the balancing weights and the boring for removing material from the universal shaft reduces the strength of the components involved and this disadvantage can only be compensated by providing excessive material in the form of a ring for boring when the components are being constructed or by using thick tubes affording sufficient safety against dangerous accumulation of tension caused, for example, by hardening at the weld spots. The increased provision of material is expensive and increases the inertia moment of the universal joint shaft which may also increase the noise of operation, particularly in Cardan shafts.

SUMMARY OF THIS INVENTION

The present invention now avoids the deficiencies of the prior art in balancing universal shafts by providing weight receiving annular grooves in sheet metal rings of C-shaped cross section that are anchored to the universal shaft and locally deformed for securing the balancing weights in their effective positions.

The weight carrying rings can be secured to the universal joint components, either directly by welding at places where the resulting hardening of metal does not cause damage, or can be mounted on a tube or other component of the universal shaft assembly. The rings have a negligible mass in comparison with the inertia of the joint shaft. The balancing weights can be inserted in the ring and secured therein by deforming the radially outer periphery of the ring by a hammer or chisel and the assembly may remain in the balancing machine for a test run after the balancing weights have been attached.

In a preferred embodiment, the weight receiving C-shaped rings are anchored to the universal shaft components adjacent the universal joints by pressing flaps out of the webs of the rings and locking the flaps to the joint components as by welding.

The invention is particularly useful in universal joint shaft assemblies where the joints can be moved axially relative to each other and are joined by a splined shaft which is surrounded by a protective tube secured to one of the joint components. This protective tube can be externally flanged at one end and can itself form the ring with a C-shaped cross section.

If desired, each balancing weight can be provided with a recess in its radial outer face into which the C-shaped ring can be pressed.

It is then an object of this invention to simplify the balancing of universal shafts.

A further object of the invention is to provide universal shafts with components defining deformable grooves into which balancing weights can be anchored.

A further object of the invention is to balance universal joint shafts without increasing the inertia of the shaft assembly by means of inexpensive balancing weights carried in rings of C-shaped cross section secured on the shafts adjacent the universal joints.

A specific object of the invention is to provide a universal joint shaft assembly with weight carrying deformable C-shaped rings embracing the assembly adjacent the universal joints thereof.

Other and further objects of this invention will be apparent to those skilled in this art from the following detailed description of the annexed sheets of drawings which, by way of examples only, illustrate several embodiments of the invention.

IN THE DRAWINGS:

FIG. 2 is a fragmentary sectional view with parts in elevation, of a modified detail of FIG. 1;

FIG. 3 is a view similar to FIG. 1 showing the other end of the universal shaft of FIG. 1.

Figure 1:
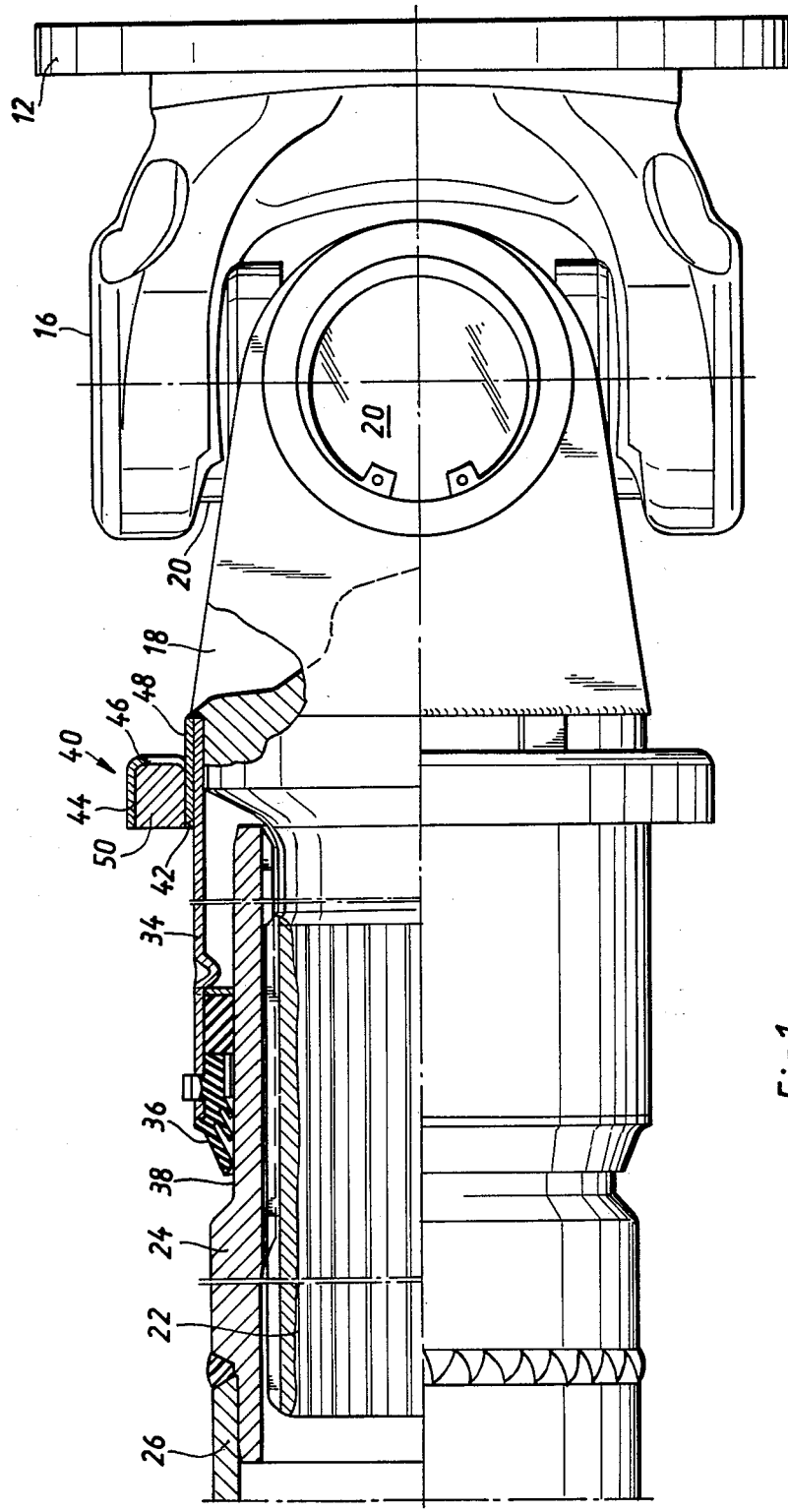
FIG. 1 is an elevational view, partly in vertical section, of one end of a universal shaft equipped with a weight balancing ring of this invention.

AS SHOWN ON THE DRAWINGS:

The universal shaft of FIGS. 1 and 3 connects the flange 12 of FIG. 1 with the flange 14 of FIG. 3.

The flange 12 is formed integral with a component 16 of a pivot universal joint and component 16 is secured to a joint component 18 by a cross pin 20. Component 18 is formed integral with an outwardly toothed splined shaft 22, which can be axially moved in an internally toothed tubular splined shaft 24. Shaft 24 is welded to one end of a tube 26 whose other end is welded to a component 28 of a second pivot universal joint. Component 28 is secured by cross pin 30 to a corresponding second joint component 32, which is formed integral with the flange 14.

Component 18 is welded to a protective tube 34 which surrounds shaft 24 along part of its length. The free end of tube 34 is provided with a sealing means 36 which seals off a flat cylindrical portion 38 of the outer surface of shaft 24. A sheet metal ring 40 is disposed on the end of tube 34 secured to component 18. Ring 40 has a C-shaped cross-section comprising a radially inward arm 42 adjacent tube 34, a radially outward arm 44 and a web 46. Arms 42 and 44 are cylindrical and coaxial with component 18 and tube 34 and web 46 lies in a plane at right angles to the axis of component 18. Flaps 48 are pressed out of web 46 at two or three places separated by equal angular distances. As shown in FIG. 1, flaps 48 form a linear extension of the radially inward arm 42 and are welded, together with tube 34, to component 18.

Ring 40 forms an annular groove, which is open in one axial direction, for receiving balancing weights 50. Weights 50 are sector-shaped and have a cross-section which substantially corresponds to the inner cross-section of ring 40.

The embodiment of FIG. 2 differs from that in FIG. 1 in that the protective tube has a different shape and is, therefore, denoted by 34'. Tube 34' is constructed integral with a C-shaped ring denoted by 40' in FIG. 2, thus saving more material and, more particularly, simplifying the assembly of the universal shaft. In FIG. 2, seal 36 is replaced by a simplified seal 36'.

FIG. 3 shows a joint component 28 secured to a ring 40" corresponding to ring 40, as before by means of two or more flaps 48" which are offset at uniform angular distances. In FIG. 3, the flaps are bent radially inward so that they form abutments on component 28 as soon as ring 42" is pushed on. FIG. 3 also shows how ring 40" can be formed with one or more notches 52 by chiseling after a balancing weight 50 has been inserted; the notches can be pressed into a balancing weight 50, which is made of lead or another soft heavy metal, thus securing the weight. In order to facilitate the pressing in of notches 52, weight 50 can be preformed with a matching recess 54 on its radially outward side with respect to the universal shaft.

From the above descriptions it will therefore be understood that this invention simplified and facilitates the balancing of universal shafts by anchoring balancing weights in a deformable groove provided by a shaft component adjacent each universal joint of the shaft.

I claim as my invention:

1. A universal shaft balancing device which comprises a sheet metal ring of C-shaped cross section having an inner peripheral arm adapted to be locked on the shaft, a deformable outer peripheral arm and a web connecting the arms, said C-shaped ring providing an annular groove with an open face at one axial end thereof adapted to receive balancing weights to be locked in the groove by inwardly deforming the outer peripheral arm of the ring.

2. The shaft of claim 1 including balancing weights in the form of arcuate segments fitting the groove.

3. The shaft of claim 1 wherein said ring is an integral part of a tube surrounding the shaft.

4. A universal shaft having a universal joint component on an end thereof, means on the component defining a deformable annular groove, and a balancing weight in said groove at a position for dynamically balancing the shaft wherein said means defining the deformable groove is a metal ring of C-shaped cross section with an inner peripheral arm anchored on the shaft, an outer peripheral arm deformed locally against the weight in the groove and a web connecting the arms.

5. The shaft of claim 4 wherein the web of the ring has flaps pressed therefrom anchoring the ring to the joint component.

6. The shaft of claim 5 wherein the flaps have inward projections adapted to snap lock on the joint component.

7. The universal shaft of claim 4 in which said outer peripheral arm has an inwardly deformed notch anchoring the balancing weight in the groove.

8. The shaft of claim 7 wherein the weight has a groove receiving the notch.

9. The shaft of claim 7 wherein the weight is deformable and the notch is pressed into the weight.

10. The device of claim 1 having flaps pressed out of the web to lock the ring to the shaft.

* * * * *